(12) United States Patent
Sakurai et al.

(10) Patent No.: US 6,596,969 B1
(45) Date of Patent: Jul. 22, 2003

(54) METHOD FOR GUIDING ARC BY LASER, AND ARC GUIDING WELDING AND DEVICE BY THE METHOD

(75) Inventors: Shigeyuki Sakurai, Tsukuba (JP); Yutaka Takano, Ibaraki-ken (JP); Naoki Miyanagi, Ibaraki-ken (JP); Yoshiaki Shimomura, Ohmura (JP); Hikaru Yamamoto, Ryugasaki (JP); Toru Takatani, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/700,408
(22) PCT Filed: Mar. 15, 2000
(86) PCT No.: PCT/JP00/01565
§ 371 (c)(1),
(2), (4) Date: Nov. 15, 2000
(87) PCT Pub. No.: WO00/54923
PCT Pub. Date: Sep. 21, 2000

(30) Foreign Application Priority Data

Mar. 16, 1999 (JP) ............................................. 11-069639
Apr. 23, 1999 (JP) ............................................. 11-115643

(51) Int. Cl.[7] ................................................. B23K 9/09
(52) U.S. Cl. .............. 219/122; 219/121.64; 219/130.51
(58) Field of Search ........................ 219/130.4, 121.63, 219/121.64, 124.22, 124.1, 130.51, 136, 137 PS, 137 R, 76.13, 122

(56) References Cited

U.S. PATENT DOCUMENTS 5,006,688 A    4/1991   Cross
5,980,681 A  * 11/1999  Siemroth et al. ........ 219/76.13

FOREIGN PATENT DOCUMENTS

| DE | 4334568 | * | 4/1995 |
| JP | 62-263869 | | 11/1987 |
| JP | 5-146877 | | 6/1993 |
| JP | 10-272577 | | 10/1998 |
| JP | 2000-107880 | | 4/2000 |

OTHER PUBLICATIONS

Abstract of National Conference of Institute of Welding, vol. 60, ('97–4), "Weaving of Arc due to CO2 Laser".

* cited by examiner

*Primary Examiner*—Clifford C. Shaw
(74) *Attorney, Agent, or Firm*—Mattingly, Stanger & Malur, P.C.

(57) ABSTRACT

In an arc welding method and apparatus, a plasma (13) is generated at a welding intended position on a base material (2) by a laser (16) irradiated to the base material (2). When a discharge electrode (12) is at a minus potential, an arc discharge (4) takes place in the direction of the plasma (13) and is induced at a position irradiated with the laser (16). When the electrode (12) is at a plus potential, arc electrons are generated from a laser irradiated point and discharged to the electrode (12). When a voltage applied between the electrode (12) and the base material (2) is alternating, the polarities of the electrode (12) and the base material (2) alternately change so that the foregoing phenomena alternately occur. When the base material (2) is at a minus potential, an arc discharge (4) takes place from a laser spot. Also, in regard to the arc discharge (4), since the plasma (13) is generated by the laser (16), a stable arc discharge (4) can be generated irrespective of the state of the base material (2) or the state of the electrode (12).

12 Claims, 17 Drawing Sheets

1 : WELDING TORCH
2 : BASE MATERIAL
12 : DISCHARGE ELECTRODE
13 : PLASMA
14 : BASE MATERIAL ELECTRODE
15 : FOCUSING LENS
16 : LASER

1 : WELDING TORCH
2 : BASE MATERIAL
12 : DISCHARGE ELECTRODE
13 : PLASMA
14 : BASE MATERIAL ELECTRODE
15 : FOCUSING LENS
16 : LASER

FIG.2A  FIG.2B  FIG.2C
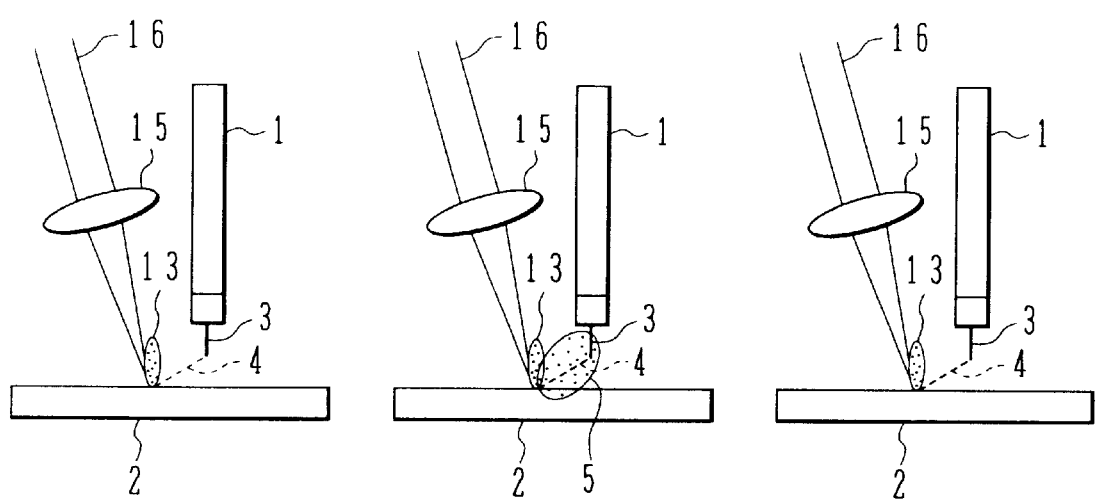
FIG.3
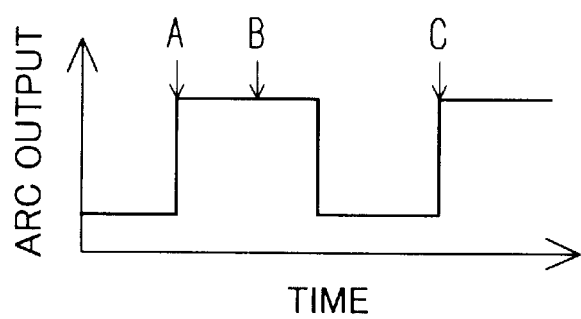

5,13 : ARC DISCHARGE PLASMA
 AND LASER PLASMA
15 : FOCUSING LENS
16 : LASER

19 : WELDING METAL

8 : BACKING JIG

7 : WELDING BEAD

1: TORCH
2: WORK
16: LASER
19: LASER FOCUSING UNIT
20: OSCILLATE UNIT
21: OPTICAL FIBER
22: TABLE
23: ELECTRODE CABLE
24: ELECTRODE CABLE
25: ROBOT
26: LASER RESONATOR
27: LASER POWER SUPPLY
28: CONTROL UNIT
29: ARC POWER SUPPLY

6 : FILLER BENDING GEAR

10 : BELT
11 : FILLER FEEDING HOSE $\beta > \alpha$

1: WELDING TORCH
2: BASE MATERIAL
5: ARC DISCHARGE PLASMA

2: BASE MATERIAL
30: WELDING MATAL
31: UNDEPOSITE PORTION

METHOD FOR GUIDING ARC BY LASER, AND ARC GUIDING WELDING AND DEVICE BY THE METHOD

TECHNICAL FIELD

The present invention relates to laser-based induction of arc discharge, and a laser based arc induction welding method and apparatus for arc welding a narrow gap.

BACKGROUND ART

Arc welding includes TIG (tungsten inert gas) welding, MIG (metal inert gas) welding, $CO_2$, MAG (meal active gas) welding, and so on. Then, for moving an arc generated position in the MIG welding and so on other than the TIG welding, it is often the case that a torch 1 having a filler electrode 3 is moved with respect to a base material 2, which is to be worked, to move the arc, as illustrated in FIG. 15. For reference, in the case of the TIG welding, an electrode is separated from a filler, so that the tungsten electrode is moved with respect to a base material, which is to be worked, to move an arc. This is because the TIG welding uses non-consumable electrode, while the MIG welding and so on use a consumable electrode.

Also, for example, in a method described in JP-A-5-146877, a feeding wire 19 is bent by a filler bending gear 6 to move an arc discharge 4 for welding, as illustrated in FIG. 16.

Also, as illustrated in FIG. 17, there is a method in which the position of an arc discharge 4 is moved using a filler 3 fed by a filler feeding hose 11 as an eccentric tip is rotated by a motor 9 and a belt 10, to form a welding bead 7 for welding.

Further, JP-A-62-263869 describes an arc welding method which induces an arc using a laser.

Also, for welding a groove using the TIG welding or the like, a torch 1 is moved for waving, as illustrated in FIG. 18, to weld the groove by means of an arc discharge 4 generated between a filler electrode 3 and a base material 2 which is to be worked.

For welding a narrow gap, the torch 1 is inserted into the gap for welding. However, since the torch 1 cannot be waved, the welding is carried out by a method as described, for example, in JP-A-5-146877.

Specifically, as illustrated in FIG. 19, a wire fed by a filler bending gear 6 is bent to form a welding bead 7 between base materials 2 within the groove for welding. Reference numeral 8 designates a backing jig.

Also, as illustrated in FIG. 20, an eccentric tip is rotated by a motor 9 and a belt 10 to rotate a filler supplied from a filler supply hose 11 to control the direction of a discharge 4.

DISCLOSURE OF THE INVENTION

However, even in the method of moving the torch in the above-mentioned prior art, and wire bending and rotated eccentric tip described in JP-A-5-146877, it is not always easy to induce an arc discharge to a precise position due to the shape of a target work, electromagnetic influence, and so on.

Also, a method described in JP-A-62-263869, which is an arc induction method for inducing an arc using a laser, is not sufficient to always reliably induce an arc to a precise position.

Particularly, in the prior art, when an arc discharge electrode (filler electrode) 3 approaches a side wall of a base material 2 in narrow gap welding, a plasma 5 is generated by an arc discharge between the electrode 3 and the side wall of the base material 2 as illustrated in FIGS. 21 and 22, resulting in a problem that the welding cannot be stably carried out, and so on.

Also, either of other arc welding such as a bending wire method, an eccentric torch rotating method, and so on does not precisely induce an arc discharge to a position to be welded, so that they have a problem in that an arc discharge takes place at a position different from a welding intended position due to the shape of a work and the influence of an electric field so that stable welding cannot be carried out.

Also, since the arc discharge cannot be precisely moved into a narrow gap, a portion A indicated in FIG. 21 is left unwelded, resulting in a problem of defective welding.

Specifically, as illustrated in FIG. 23, when the distance $\alpha$ between an electrode 3 and a side wall of a base material 2 is smaller than the distance $\beta$ between the electrode 3 and the bottom of a groove of the base material 2, an arc discharge plasma 5 is generated on the side wall during arc welding.

For this reason, as illustrated in FIG. 24, the groove side wall is welded by a welding metal 30, but the bottom of the groove is left as an unwelded portion 31.

For preventing the bottom of the gap from being left unwelded, it is contemplated to extend the gap angle from 45 degrees to approximately 90 degrees, in which case, however, a welded portion is largely increased and a longer time is taken for welding. Further, a larger amount of filler material to be melted must be consumed, thereby increasing a welding cost.

As another method, it is contemplated to gouge an unwelded portion from the back surface after a welding operation to again weld the unwelded portion from the back surface.

However, this method requires an additional time for gauging and repetitive welding, and causes an increased cost. Further, the gauging from the back surface itself may be difficult in some cases.

In the prior art, an example of inducing an arc with laser is described in JP-A-62-263869 which, however, is not sufficient to always reliably induce an arc to a precise position. Specifically, after an arc is generated at a desired portion by means of laser, a plasma caused by the generated arc acts to give rise to a phenomenon illustrated in FIG. 23.

Also, as described in "Weaving of Arc due to $CO_2$ Laser," Abstract of National Conference of Institute of Welding, Vol. 60 ('97-4), a fast surface treatment is accomplished by a laser included TIG arc.

However, in the fast surface treatment relying on the laser induced TIG arc, a wide gap exists between a TIG electrode and a work, and a moving speed is so high that this is not a region which can be welded by a TIG arc alone, and in which the directivity of the TIG arc is lost near the base material. For this reason, a precise induction of an arc in the TIG welding is difficult.

It is a first object of the present invention to provide a laser-based arc induction method which is capable of precisely producing a stable arc discharge at a desired position, stably inducing an arc discharge to an arc discharge position by means of a laser, and stabilizing the arc discharge itself.

It is a second object of the present invention to provide a laser-based arc induction welding method and apparatus which are capable of precisely performing stable arc welding at such positions as the bottom and a corner of a narrow gap, and capable of stabilizing an arc discharge.

To achieve the above objects, the present invention is configured in the following manner.

(1) In a laser-based arc induction method for irradiating a laser to a work intended position on a surface of an object intended for working, and inducing an arc discharge generated between an arc electrode and the object intended for working to take place between the arc electrode and a position irradiated with the laser, an arc discharge voltage supplied between the arc electrode and the object intended for working is a periodically changing voltage.

(2) Preferably, in the laser-based arc induction method of (1) set forth above, the periodically changing voltage is an alternating voltage.

(3) Also, preferably, in the laser-based arc induction method of (1) set forth above, the periodically changing voltage is a pulsed voltage.

(4) Also, preferably, in the laser-based arc induction method of (3) set forth above, a pulse interval of the pulsed voltage is 0.1 ms or more.

(5) In a laser-based arc induction welding method, a periodically changing voltage is applied between an arc electrode and an object intended for welding, a laser is irradiated to a welding intended position on the object intended for welding to generate a plasma and metallic vapor when arc welding is performed, and an arc discharge is induced to the welding intended position irradiated with the laser to perform the arc welding.

(6) Preferably, in the laser-based arc induction welding method of (5) set forth above, the periodically changing voltage is an alternating voltage.

(7) Also, preferably, in the laser-based arc induction welding method of (5) set forth above, the periodically changing voltage is a pulsed voltage.

(8) Also, preferably, in the laser-based arc induction welding method of (5) set forth above, the object intended for welding is a welding intended portion within a narrow gap.

(9) Also, preferably, in the laser-based arc induction welding method of (5) set forth above, the laser is swung with respect to the welding intended position.

(10) A laser-based arc induction welding apparatus comprises voltage applying means for applying a periodically changing voltage between an arc electrode and an object intended for welding, laser irradiating means for irradiating a laser to a welding intended portion within a narrow gap of the object intended for welding when an arc welding is performed, and control means for controlling operations of the voltage applying means and the laser irradiating means, wherein the laser is irradiated to the welding intended portion of the object intended for welding to generate a plasma and metal vapor, and an arc discharge is induced to the welding intended portion irradiated with the laser to perform the arc welding.

(11) A laser-based arc induction welding apparatus comprises voltage applying means for applying a periodically changing voltage between an arc electrode and an object intended for welding, laser irradiating means for irradiating a laser to a welding intended portion within a narrow gap of the object intended for welding when an arc welding is performed, weaving means for weaving the laser with respect to the welding intended position on the object intended for welding, and control means for controlling operations of the voltage applying means, the laser irradiating means and the weaving means, wherein the laser is irradiated to the welding intended portion of the object intended for welding to generate a plasma and metallic vapor, and an arc discharge is induced to the welding intended portion irradiated with the laser to perform the arc welding.

(12) Preferably, in the laser-based arc induction welding apparatus of (10) or (11) set forth above, the periodically changing voltage is an alternating voltage.

(13) Also, preferably, in the laser-based arc induction welding apparatus of (10) or (11) set forth above, the periodically changing voltage is a pulsed voltage.

Since the arc discharge voltage is a pulsed or alternating periodically changing voltage, after the generation of an arc discharge, induced by the laser, is started at the laser irradiated position, the arc discharge voltage is reduced before the arc is induced to a position different from the laser irradiated position due to a plasma generated by the arc discharge to extinguish or mitigate the plasma generated by the arc discharge. Then, after the plasma generated by the arc discharge is extinguished, the arc voltage is increased to continue the arc welding at the position irradiated with the laser.

Also, generally, a plasma generated by an arc discharge extinguishes in about 0.5 ms after the arc discharge level decreases. Therefore, the pulse interval of the pulsed arc discharge voltage may be 0.1 ms or more.

BRIEF DESCRIPTION OF THE DRAWINGS

FIGS. 2A, 2B, 2C are diagrams for explaining the principles of the present invention;

FIG. 3 is a diagram for explaining the principles of the present invention;

BEST MODE FOR CARRYING OUT THE INVENTION

An embodiment of the present invention will hereinafter be described with reference to the accompanying drawings.

First, the principles of the present invention will be explained.

A laser-based arc induction phenomenon involves generating a plume comprised of ionized metallic vapor, hot electrons and so on from a laser irradiated portion by laser irradiation. The generation of the plume causes a reduced impedance between a torch electrode and the laser irradiated portion of a base material in the air which is substantially in an insulating state. Also, since the laser irradiated portion of the base material is heated to emit hot electrons, an arc discharge is induced at the laser irradiated portion.

Figure 1:
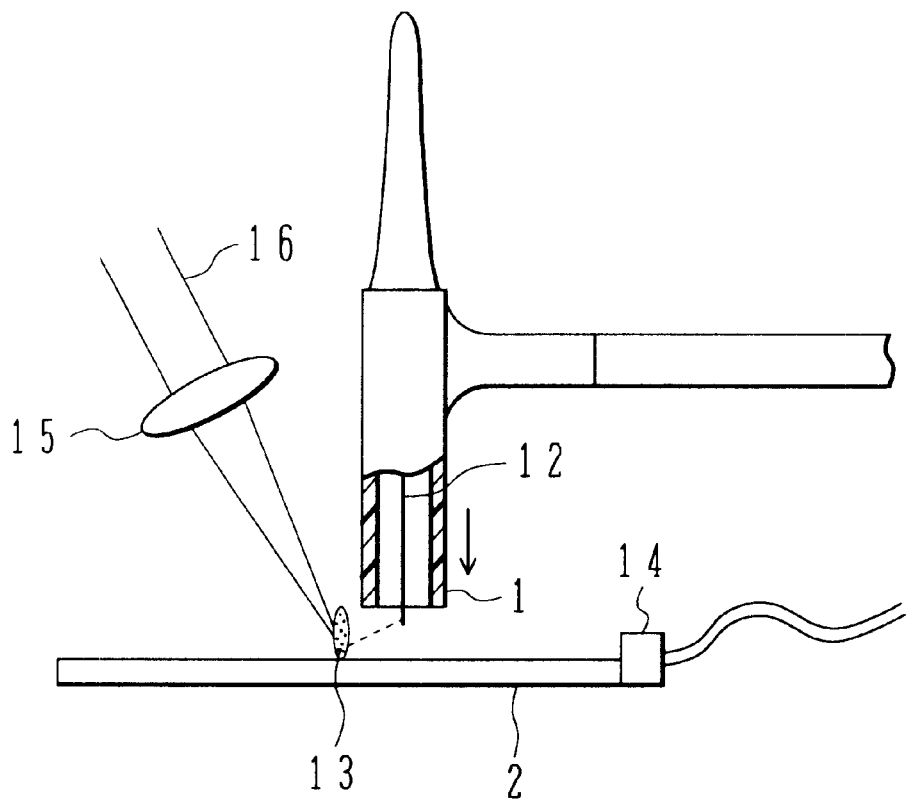
FIG. 1 is a diagram for explaining the principles of the present invention in connection with the induction of an arc discharge in TIG welding taken as an example.

FIG. 1 is a diagram for explaining the principles of the present invention in connection with the induction of an arc discharge in TIG welding taken as an example.

In FIG. 1, a torch 1 is a torch for TIG welding. An electrode 12 in FIG. 1 is applied with an AC or pulsed voltage (periodically changing voltage) for a base material 2. Reference numeral 14 designates a base material electrode. Also, an argon gas is injected from the torch 1.

In this event, as a laser 16 is irradiated to a desired position on the base material 2 through a focusing lens 15, a plasma 13 is generated at a welding intended position on the base material 2 by the laser 16 irradiated to the base material 2, as illustrated in FIG. 2A.

The plasma 13 has an electric conductivity higher than an external atmosphere, so that a potential difference between the aforementioned discharge electrode 12 and the base material 2 causes generation of an arc discharge 4 toward the plasma 13 when the electrode 12 is at a minus potential, and the arc discharge 3 is induced to the position irradiated with the laser 16 (FIG. 2B).

When the electrode 12 is at a plus potential, an arc discharge 4 takes place from the laser irradiated point, and discharges to the electrode 12 passing through the region of the plasma 13 (FIG. 2C).

When a voltage applied between the electrode 12 and the base material 2 is alternating or pulsed, the foregoing phenomena alternately occur to cause a discharge since the polarities of the electrodes 12 and the base material 2 alternately change as shown in FIG. 3.

In this event, when the base material 2 is at a minus potential, an arc discharge 4 takes place from the laser spot. This is because the base material 2 is locally heated by the laser irradiation to allow hot electrons to be readily emitted.

Also, in regard to this arc discharge 4, since the plasma 13 is generated by the laser 16, the stable arc discharge 4 can be generated irrespective of the state of the base material 2 or the state of the electrode 12.

Here, with the technique described in the prior art JP-A-62-263869, an arc is induced by the effect of a plasma, hot electrons and so on generated from a base material as an action of the laser irradiation. However, conditions such as a voltage of a laser power supply and so on are not described.

Figure 4A:
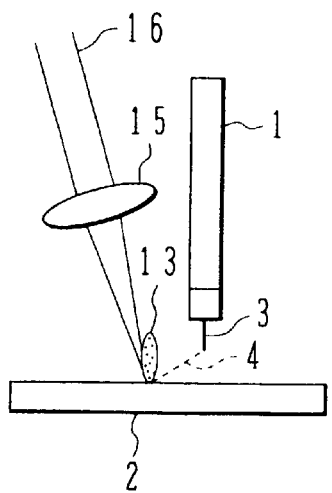
FIGS. 4A, 4B, 4C are diagrams for explaining the principles of the prior art for comparison with the principles of the present invention.
Figure 5:
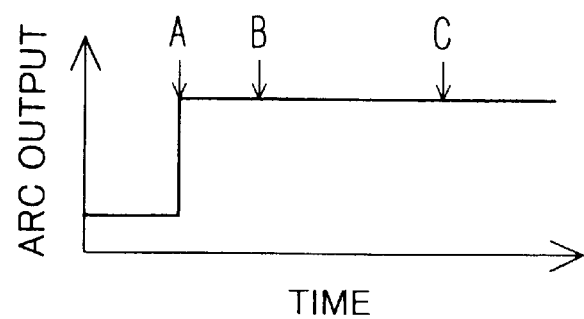
FIG. 5 is a diagram for explaining the principles of the prior art for comparison with the principles of the present invention.

For example, as illustrated in FIGS. 4A and 5, when the output of an arc is constant rather than alternating or pulsed, an arc discharge 4 takes place due to a voltage between the arc electrode 3 and the base material 2 after a plasma 13 is generated by the laser 16.

Figure 4B:
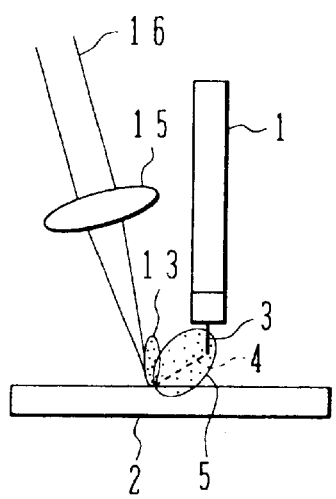

Subsequently, as illustrated in FIG. 4B, the arc discharge 4 causes generation of a plasma 5 around this arc discharge 4. This reduces the induction effect of the plasma 13 by the laser 16, so that the arc discharge 4 moves to the position at which the distance between the arc electrode 3 and the base material 2 is the shortest, as illustrated in FIG. 4C.

Figure 4C:
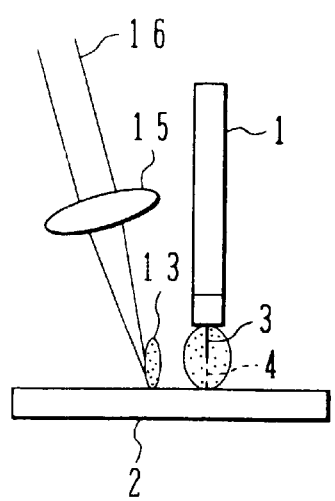

In contrast, by making the arc discharge voltage pulsed or alternating as in FIGS. 2A, 2B, 2C and 3 which show the principles of the present invention, it is possible to avoid the generation of the arc discharge 4 at a position different from a laser irradiated position, as illustrated in FIG. 4C, even if the distance between a position irradiated with the laser 16 and the arc electrode 3 is large, so that a range of inducing the arc discharge 4 can be extended. Also, the arc discharge 4 can be stably induced to a laser irradiated position.

This is because the plasma 5 caused by the arc discharge 4 is not yet generated in an initial state, and in this state, the arc discharge 4 is induced to a position irradiated with the laser 16 at which the plasma 13 is being generated by the laser 16.

Subsequently, as illustrated in FIG. 2B, the generation of the plasma 5 begins due to the arc discharge 4.

Then, since a pulsed arc discharge voltage is applied, the voltage decreases to mitigate the generation of the plasma 5 and once extinguish the plasma 5. Thereafter, the arc voltage is again increased as illustrated in FIG. 2C, enabling the arc discharge 4 to be induced again to the position irradiated with the laser 16. This phenomenon is similar when the arc voltage is alternating.

In this way, under some particular conditions, stable and reliable arc induction can be accomplished.

Further, some example of inducing an arc by means of laser in the prior art performs a fast surface treatment by laser induction of a TIG arc, in which case, a wide gap between a TIG electrode and a work and a high moving speed lead to the likelihood of the directivity of the TIG arc lost near a base material. For this reason, the induction of the TIG arc in the prior art experiences difficulties in the induction in a region in which the TIG arc has a high energy density near the base material.

In contrast, according to the present invention, since the arc discharge voltage is pulsed or alternating as mentioned above, it is possible to avoid the generation of an arc discharge at a position different from a laser irradiated position even if there is a large distance between a laser irradiated position and an arc electrode, so that the arc discharge can be stably induced to the laser irradiated position.

In other words, according to the present invention, a stable arc discharge can be precisely generated at a desired position, thereby making it possible to realize a laser-based arc induction method which can stably induce an arc discharge position by means of the laser, and stabilize the arc discharge itself.

In the example illustrated in FIG. 1, a position of the base material 2 irradiated with the laser 16 (laser spot) can be moved by an appropriate method. Specifically, a method can be employed for transmitting the laser 16 through a fiber and moving a laser exit port from the fiber together with the focusing lens 15.

Figure 6:
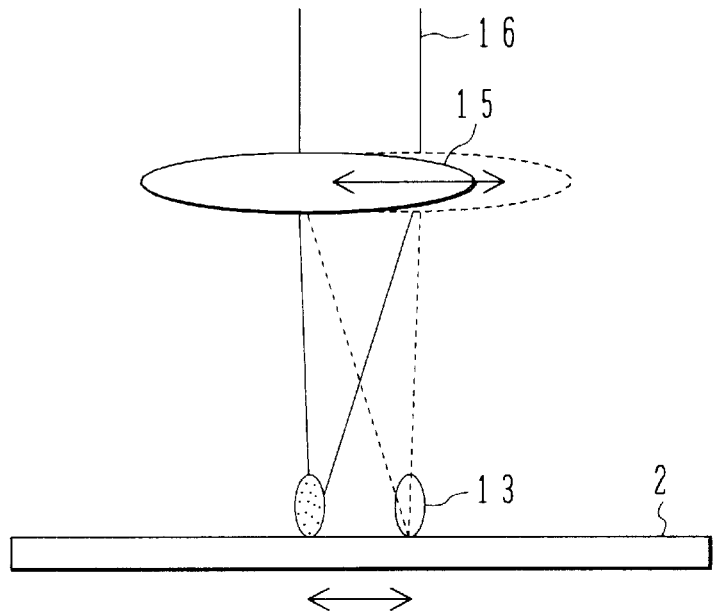
FIG. 6 is a diagram illustrating an example of a method of moving a laser to an irradiating position on a base material.

Alternatively, other than the above moving method, a method may be employed for moving a laser spot on the base material 2 by moving the lens 15 with respect to the laser 16, as illustrated in FIG. 6.

Figure 7:
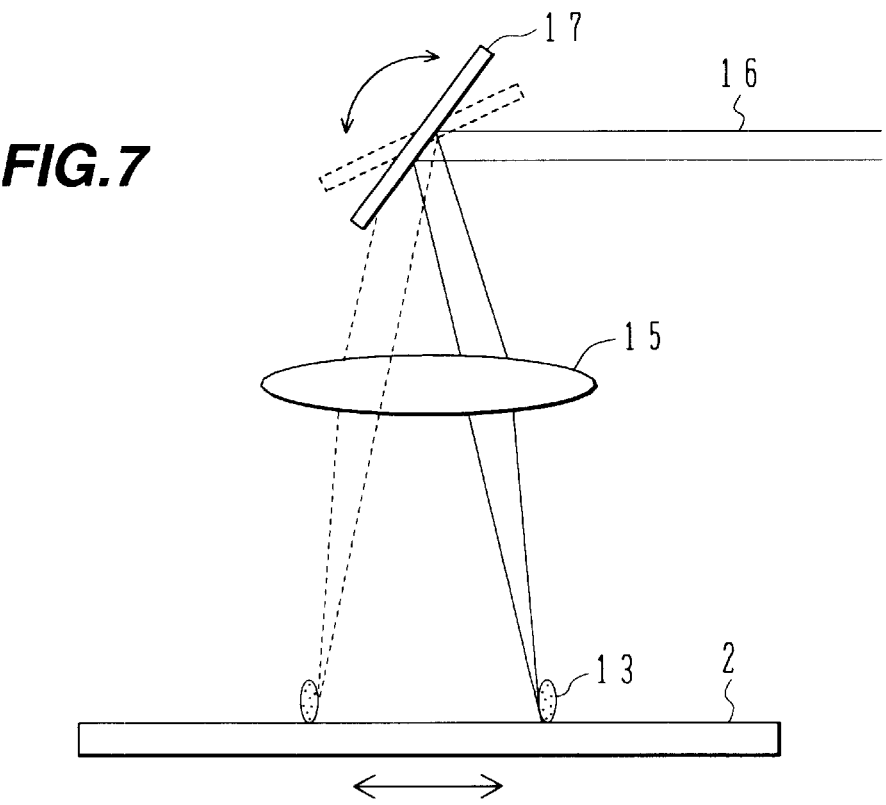
FIG. 7 is a diagram illustrating another example of a method of moving a laser to an irradiating position on a base material.

Alternatively, as illustrated in FIG. 7, the laser 16 is irradiated to a mirror 17, and the laser 16 reflected from the mirror 17 is irradiated to the base material 2 through the focusing lens 15. Then, a laser spot on the base material 2 can be moved by changing the angle of the mirror 17 with respect to the laser 16.

Figure 8:
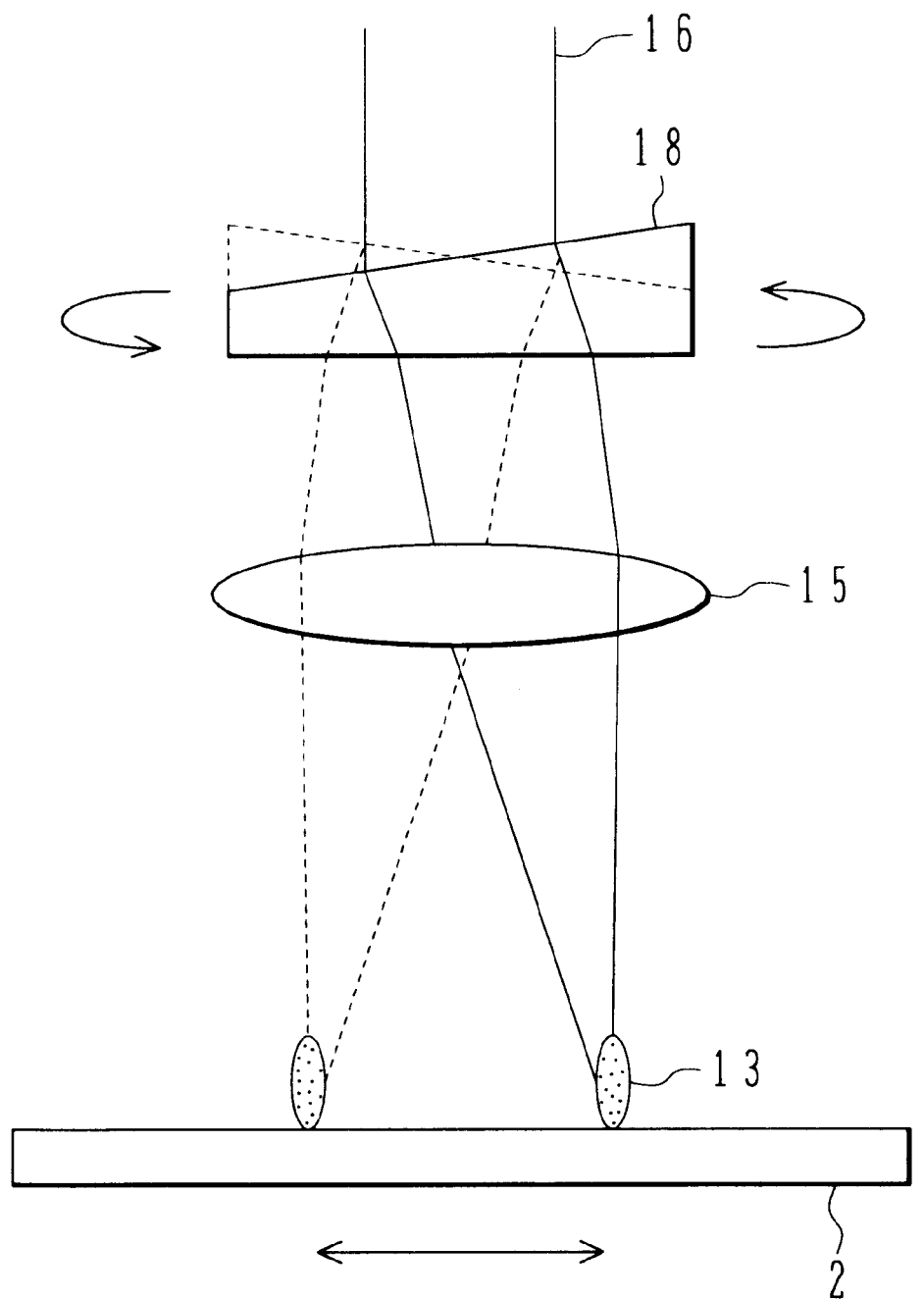
FIG. 8 is a diagram illustrating a further example of a method of moving a laser to an irradiating position on a base material.

Alternatively, as illustrated in FIG. 8, the laser 16 is irradiated to the base material 2 through a wedge substrate 18 and the focusing lens 15. Then, the laser 16 is moved by rotating the wedge substrate 18, whereby a laser spot on the base material 2 can be moved.

The weaving of arc welding can be precisely and stably performed by applying a pulsed or alternating arc discharge voltage and moving a position on the base material 2 irradiated with the laser 16 by the methods illustrated in FIGS. 6 to 8.

Figure 15:
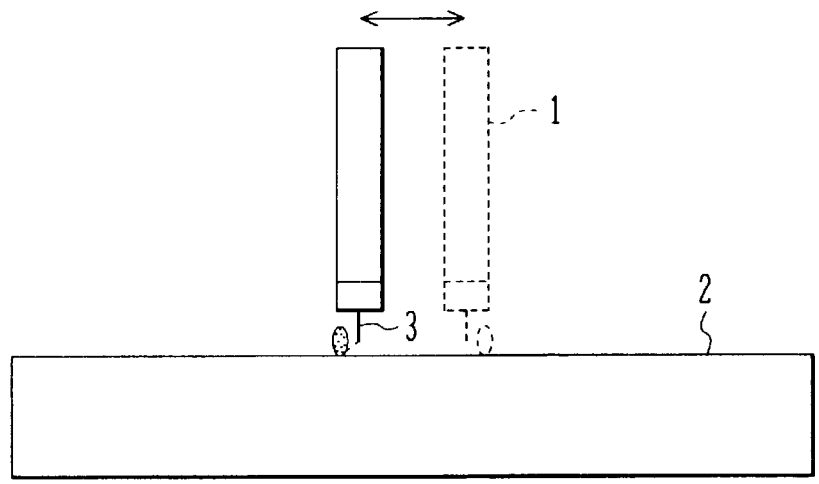
FIG. 15 is a diagram illustrating an example of moving an arc generated position in the prior art.
Figure 16:
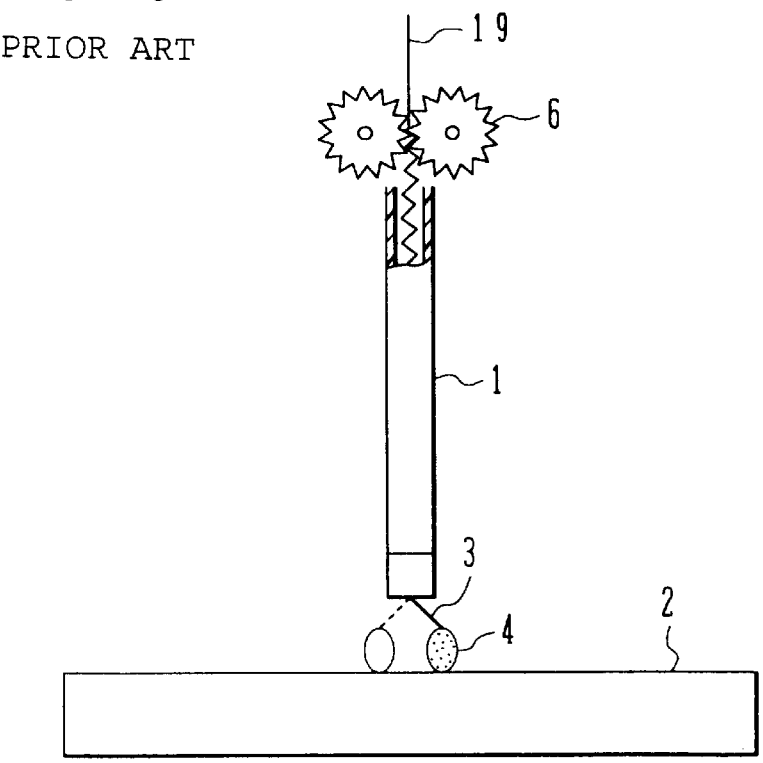
FIG. 16 is a diagram illustrating another example of moving an arc generated position in the prior art.
Figure 17:
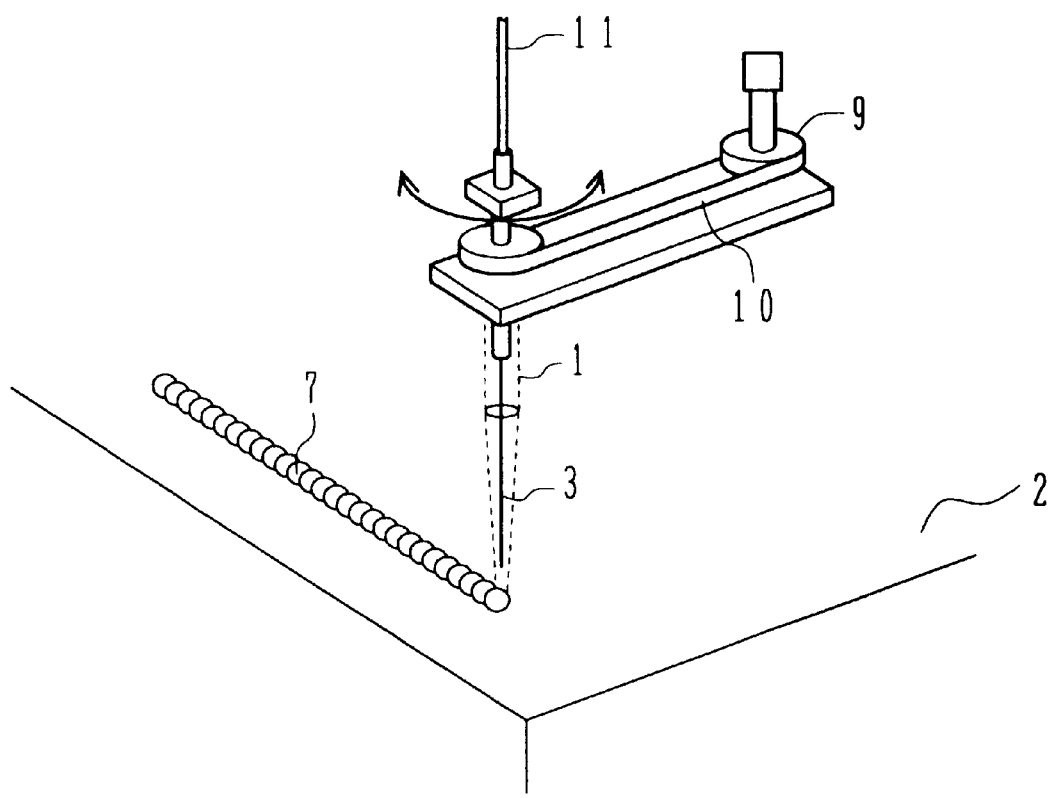
FIG. 17 is a diagram illustrating a further example of moving an arc generated position in the prior art.

Also, this enables the arc to be stably and precisely induced without the need for bending a wire or moving the electrode 3, without suffering the influence of the shape of the work 2, as in the examples illustrated in FIGS. 15, 16 and 17.

Generally, a plasma generated by an arc discharge extinguishes in about 0.5 ms after the arc discharge level decreases. Therefore, the pulse interval may be a time required for the arc discharge plasma to extinguish or mitigate, for example, 0.1 ms or more, and preferably 0.5 ms or more.

When the arc discharge voltage is applied after the extinction of a plasma generated by an arc discharge to resume an arc discharge, a plasma by the laser induces an arc discharge, so that the arc discharge can be generated at a position irradiated with the laser from the arc electrode.

Next, description will be made on an example in which the present invention is applied to a laser-based arc induction welding method and apparatus for arc welding a narrow gap.

Figure 9:
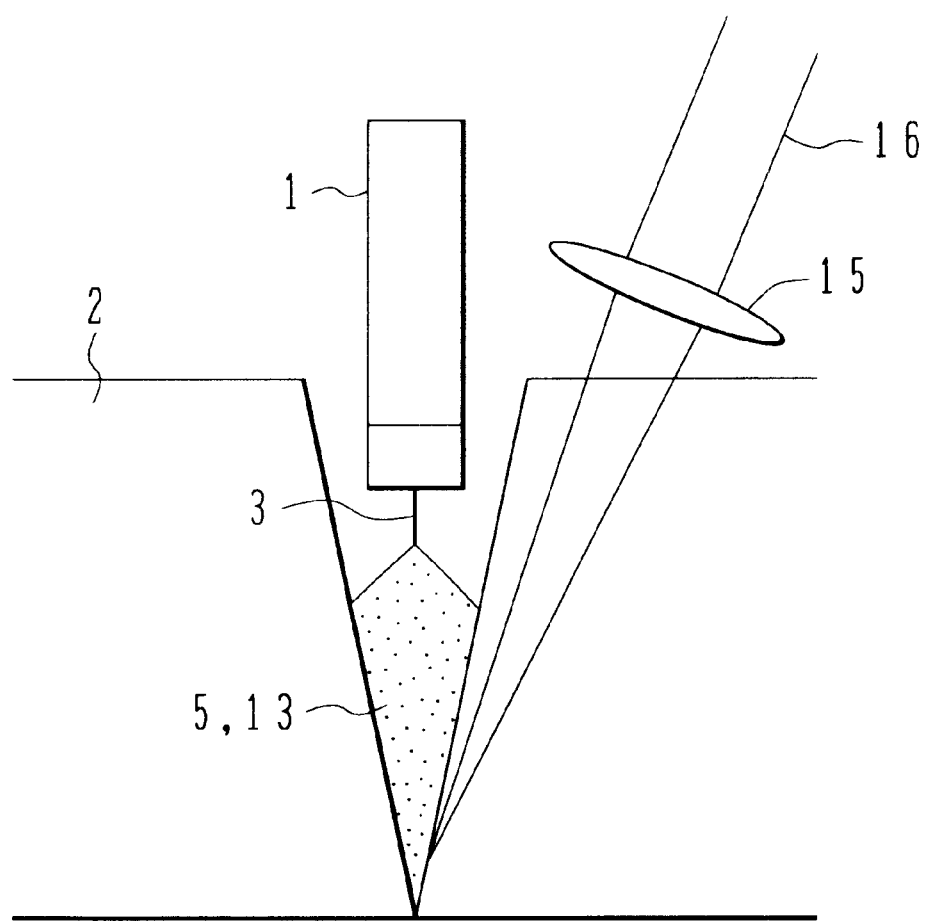
FIG. 9 is a diagram for explaining a state in which the bottom of a gap is being welded in accordance with the present invention.
Figure 10:
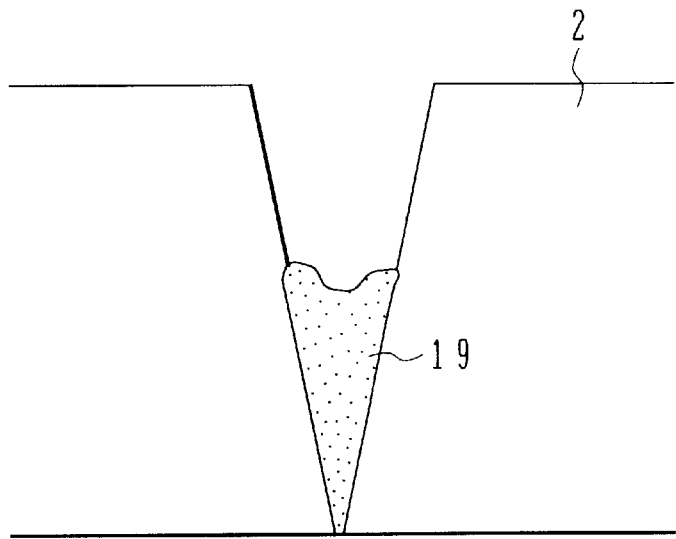
FIG. 10 is a diagram illustrating a state in which the bottom of the gap has been welded in accordance with the present invention.

As illustrated in FIGS. 9 and 10, for welding the bottom of a narrow gap, the bottom is irradiated with the laser 16 to induce an arc discharge, and then the arc discharge voltage is reduced before an arc-based plasma is generated between the electrode 3 and a side wall to give rise to an arc between the electrode 3 and the side wall. Such a configuration enables the bottom of the narrow gap to be more precisely welded by a welding metal 19.

Figure 11:
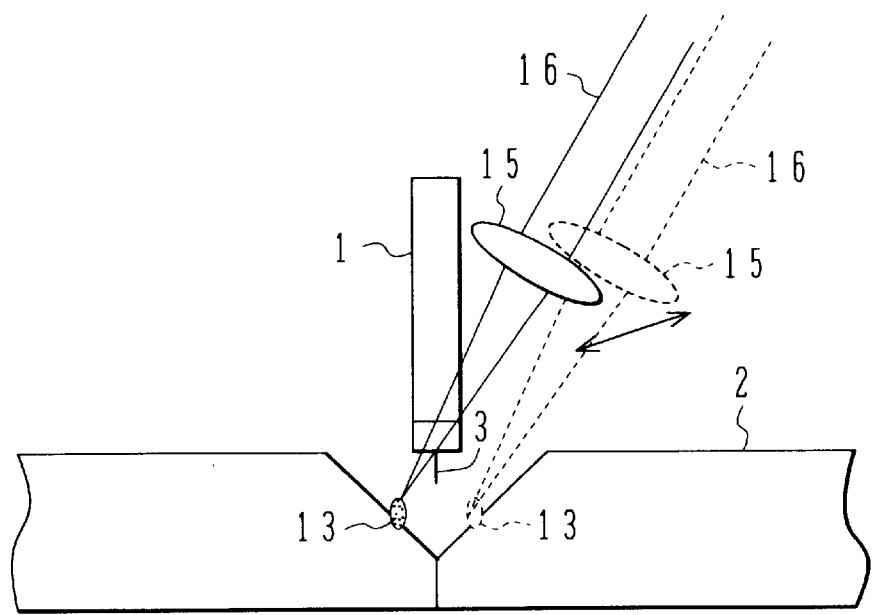
FIG. 11 is a diagram illustrating how weaving is performed by a laser inducing action in the present invention in the case of a narrow gap.
Figure 12:
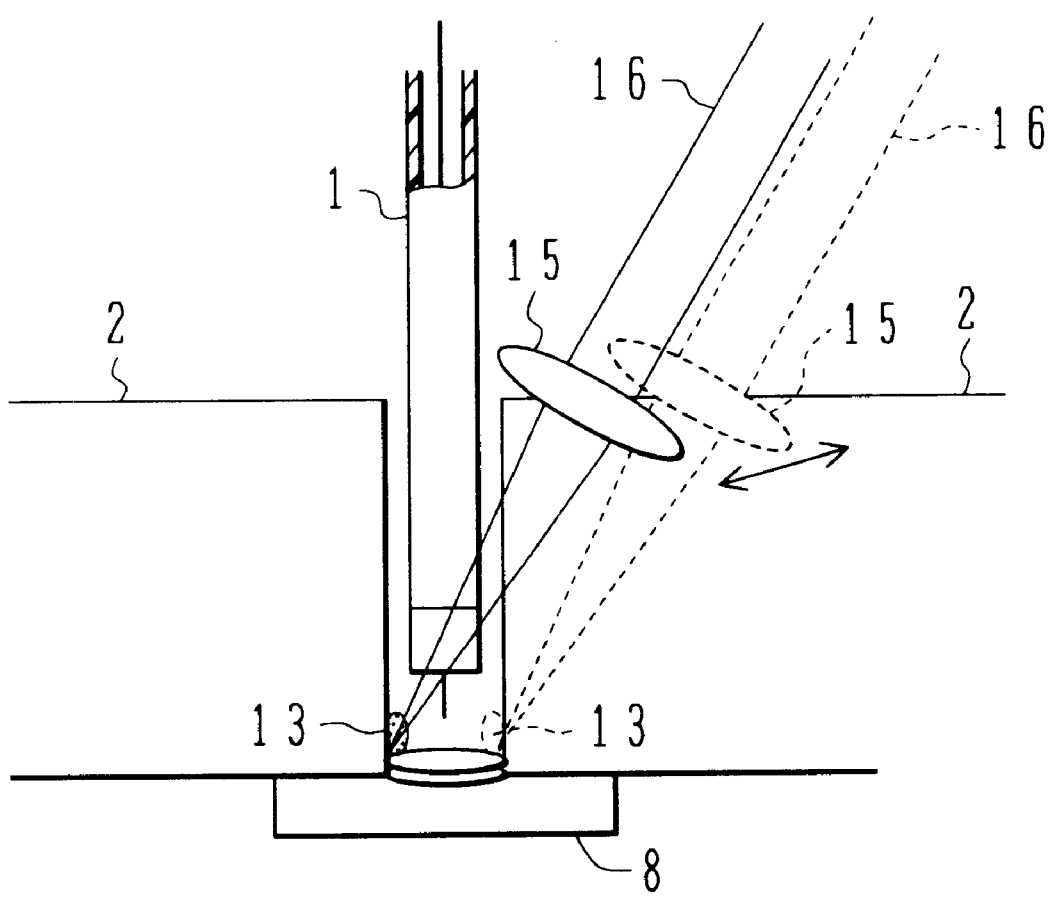
FIG. 12 is a diagram illustrating how weaving is performed by a laser inducing action in the present invention in the case of a narrow gap.
Figure 13:
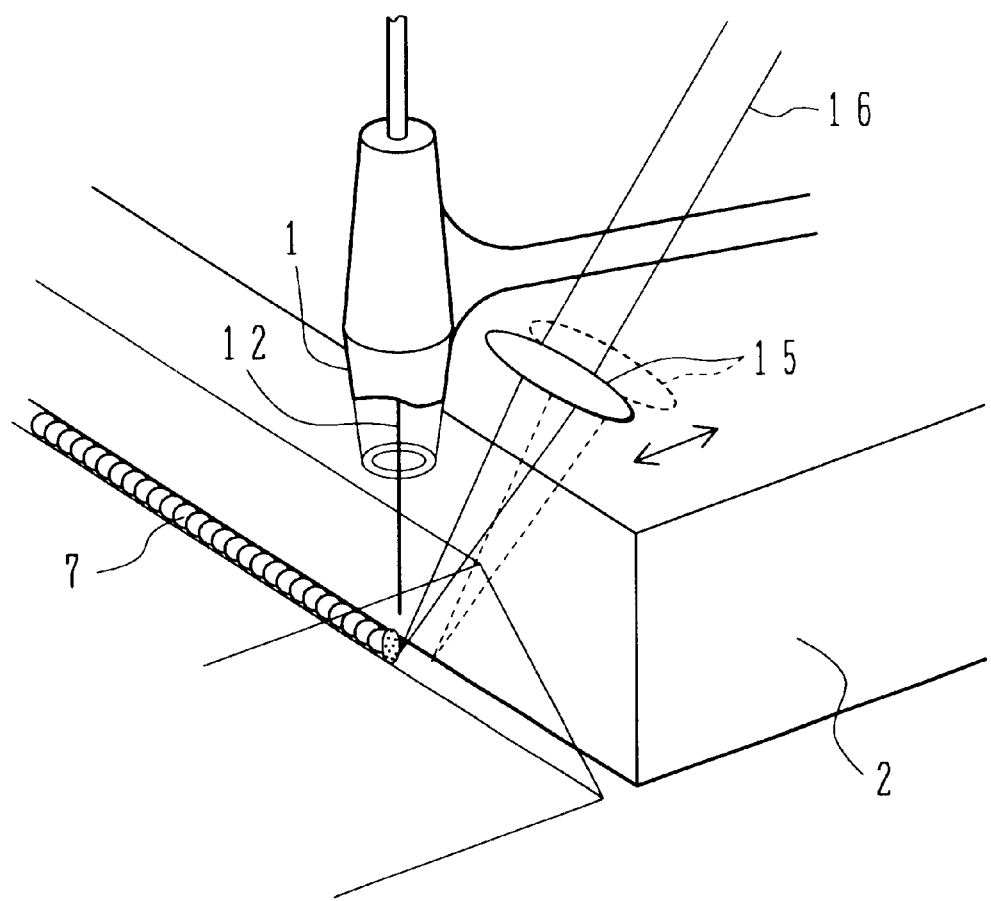
FIG. 13 is a diagram illustrating how weaving is performed by a laser inducing action in the present invention in the case of a narrow gap.

For practicing the laser-based arc induction welding method according to the present invention, an arc discharge is induced at a position irradiated with the laser 16 to generate an arc discharge between the electrode 3 and the work (base material) 2 for welding the gap, as illustrated in FIGS. 11, 12, 13.

Further, by weaving the spot of the laser 16 within the narrow gap, an arc can be induced within the gap, so that the arc discharge can be stably generated toward the bottom of the narrow gap.

Here, for moving a laser spot, the aforementioned methods illustrated in FIGS. 6, 7, 8 may be used other than a method of moving the laser 16 itself.

By moving a position irradiated with the laser 16 within the groove by the method as described above, the bottom of the groove can be stably arc welded without discharging to a side wall.

Figure 18:
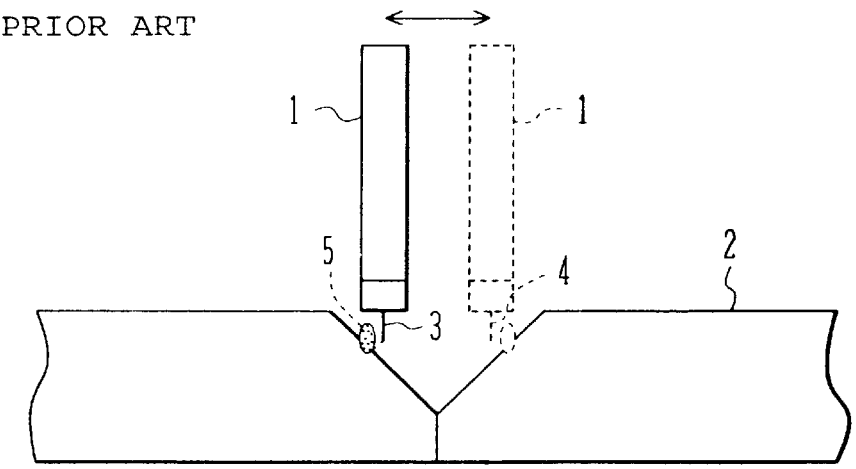
FIG. 18 is a diagram illustrating how weaving is performed for welding a narrow gap with MAG welding in the prior art.
Figure 19:
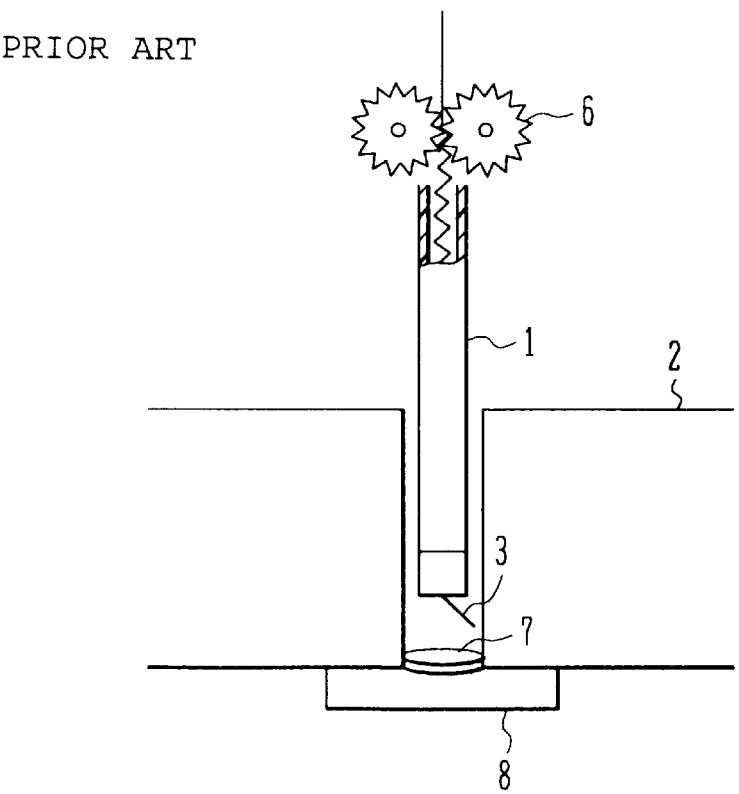
FIG. 19 is a diagram illustrating how weaving is performed using a bending wire for welding a narrow gap in the prior art.
Figure 20:
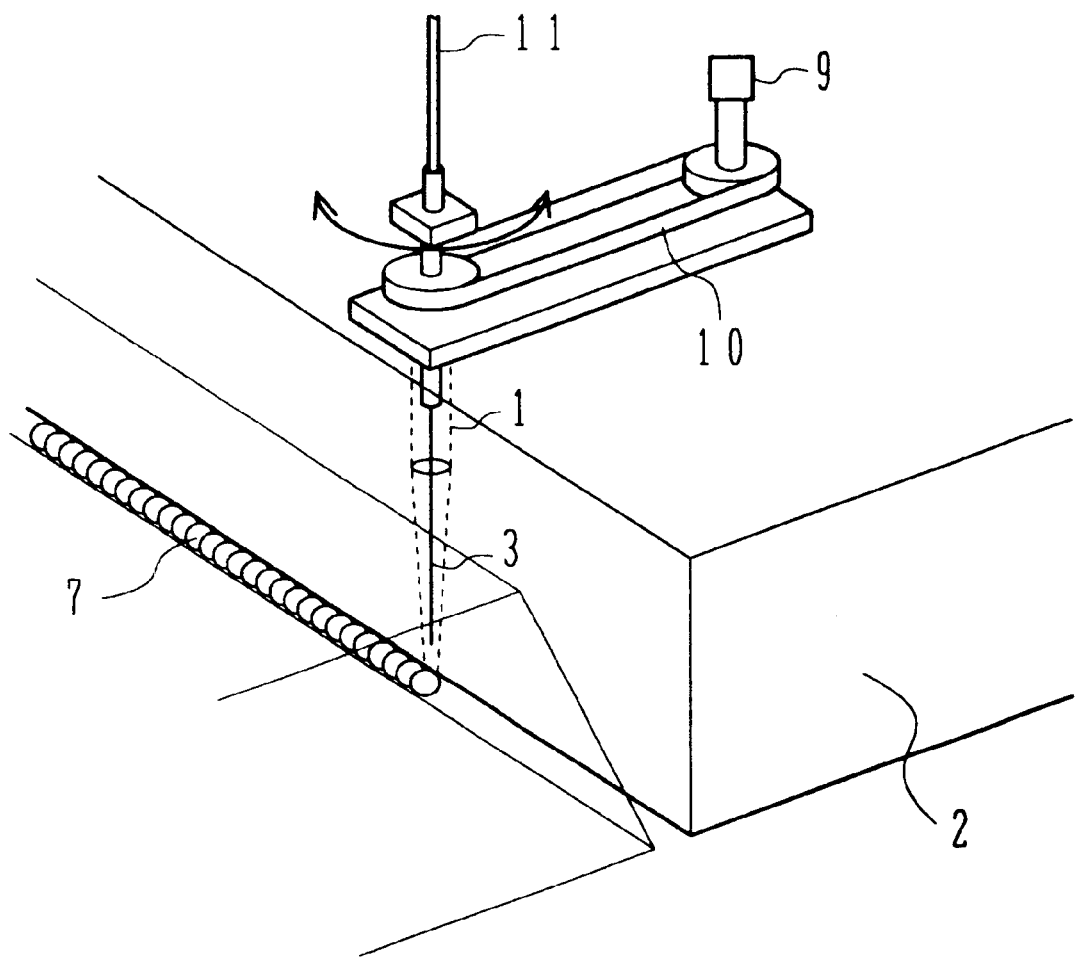
FIG. 20 is a diagram illustrating how weaving is performed using a torch rotating method for welding a narrow gap in the prior art.
Figure 21:
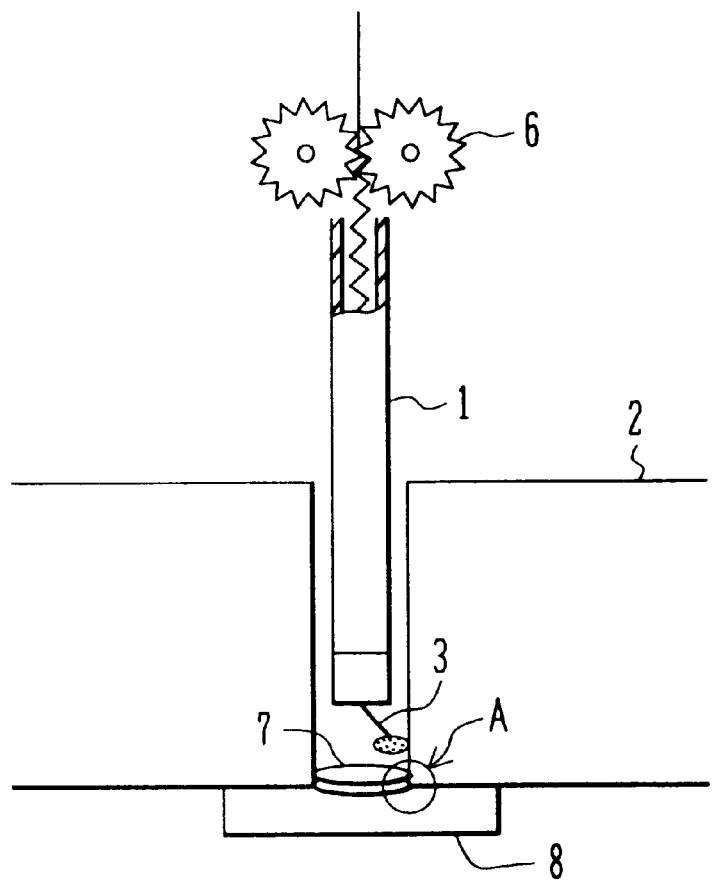
FIG. 21 is a diagram illustrating a state in which an arc discharge takes place on a side wall when the narrow gap is welded as illustrated in FIG. 19 in the prior art.
Figure 22:
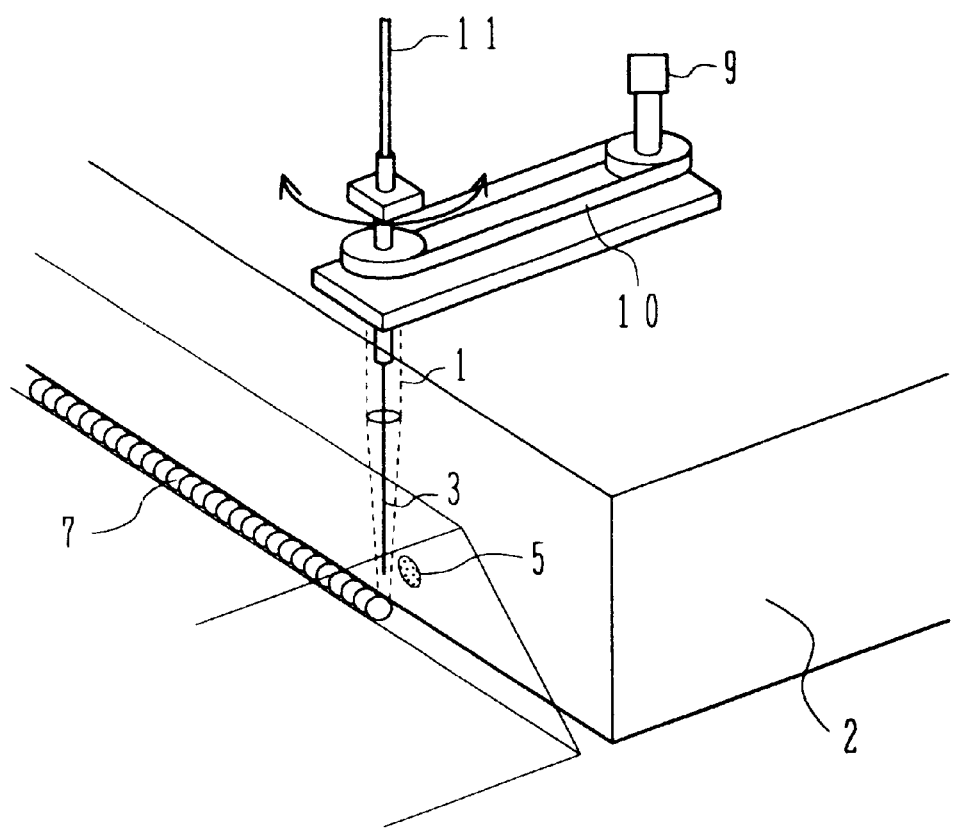
FIG. 22 is a diagram illustrating a state in which an arc discharge takes place on a side wall when the narrow gap is welded as illustrated in FIG. 20 in the prior art.
Figure 23:
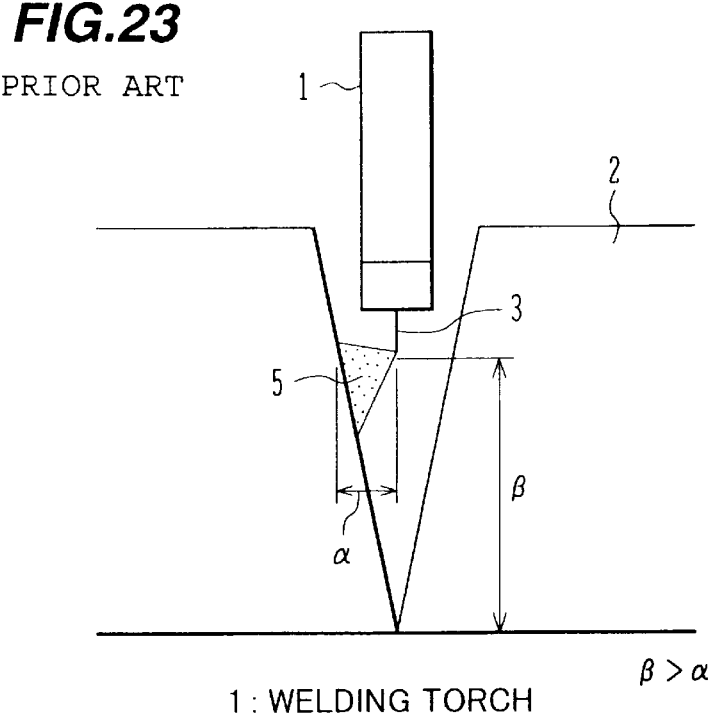
FIG. 23 is a diagram illustrating a state in which an arc discharge takes place on a side wall when a narrow gap is welded in the prior art.
Figure 24:
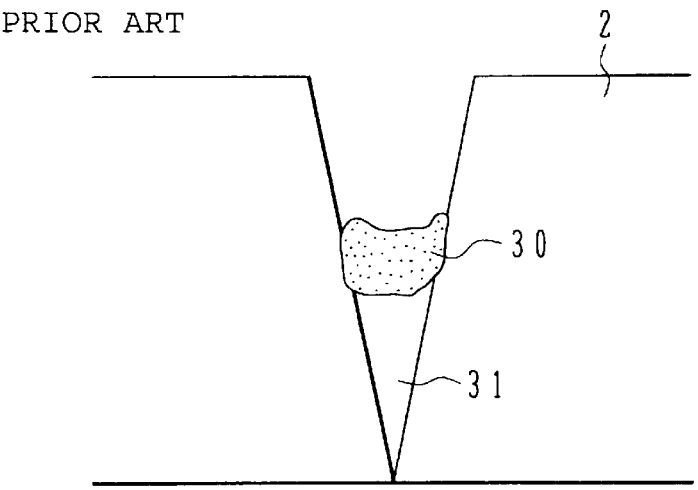
FIG. 24 is a diagram for explaining a state in which the bottom of a narrow gap is not welded when a narrow gap is welded in the prior art.

Also, this allows arc welding to be stably and precisely performed without the need for bending a wire or moving the electrode 3 as illustrated in FIGS. 18, 19, 20, and without suffering the influence of the shape of the work 2.

In other words, according to the present invention, it is possible to realize a laser-based arc induction welding method which can precisely perform stable arc welding at a position on the bottom and at a corner of a narrow gap, and stabilize an arc discharge.

Figure 14:
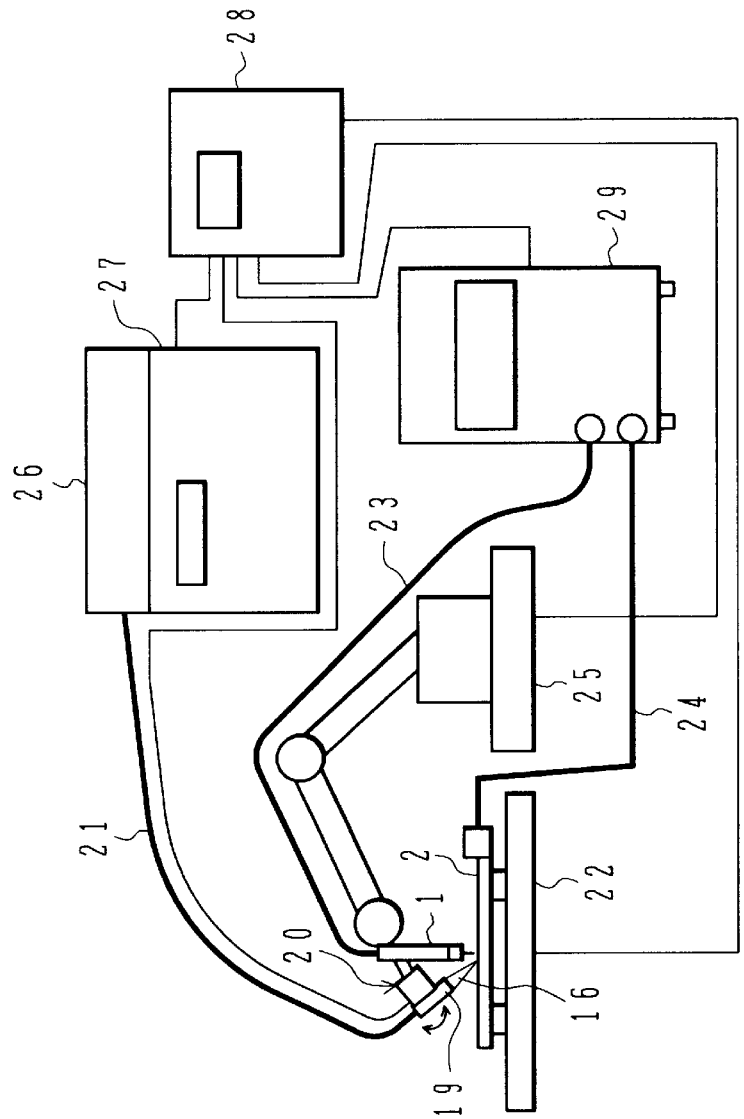
FIG. 14 is a schematic configuration diagram of a laser arc induction welding apparatus which is an embodiment of the present invention.

FIG. 14 is a schematic configuration diagram of a laser arc induction welding apparatus for implementing the laser based arc induction welding method of the present invention.

In FIG. 14, an arc voltage from an arc power supply 29 is supplied to a welding torch 1 through an electrode cable 23 and also supplied to a work 2 placed on a table 22 through an electrode cable 24. Also, laser 16 generated from a laser oscillator 26 connected to a laser power supply 27 is irradiated to the work 2 through an optical fiber 21 and a focusing unit 19.

The focusing unit 19 is moved by an oscillate unit 20 as required to move the laser 16 on the work 2.

These torch 1, focusing unit 19 and oscillate unit 20 are attached on a welding robot 25. Then, the operations of the oscillate unit 20, table 22, robot 25, laser power supply 27 and arc power supply 29 are controlled by a control unit 28.

In other words, the control unit 28 executes the laser-based arc induction welding method according to the present invention described above.

First, the control unit 28 operates the robot 25, and moves the table 22 to place the work 2 at a position at which the laser 16 is irradiated to a desired position on the work 2. Subsequently, the control unit 28 controls the arc power supply 29 to start applying a pulsed or alternating arc discharge voltage between an electrode of the torch 1 and the work 2.

Next, the control unit 28 controls the laser power supply 27 to irradiate the laser 16 from the laser oscillator 26 to the work 2. In this event, the control unit 28 operates the oscillate unit 20 to weave the laser 16. Then, the control unit 20 controls the operations of the robot 25 and the table 22 to weld the work 2 along a desired welding line.

According to the present invention described above, it is possible to realize a laser-based arc induction welding apparatus which can precisely perform stable arc welding at a position on the bottom and at a corner of a narrow gap and stabilize an arc discharge.

INDUSTRIAL APPLICABILITY

According to the present invention, by employing a pulsed or an alternating arc output, it is possible to irradiate a base material with a laser, precisely induce an arc discharge to a position irradiated with the laser, and generate a stable arc discharge since a trace of plasma is left generated by the laser.

Thus, according to the present invention, it is possible to realize a laser-based arc induction method which can precisely perform a stable arc discharge at a desired position, stably induce an arc discharge position by the laser, and stabilize the arc discharge itself.

Also, according to the present invention, it is possible to realize a laser-based arc induction welding method and apparatus which can precisely perform stable arc welding at a position on the bottom and at a corner of a narrow gap and stabilize an arc discharge.

What is claimed is:

1. An arc welding method for welding at an intended position on a surface of an object to be welded by irradiating a laser to said intended position, and welding at said intended position, comprising the steps of:
    (a) continuously irradiating a laser to said intended position on a surface of an object to be welded during a welding period;
    (b) inducing an arc discharge generated between an arc electrode and said object to be welded, said arc discharge being induced with a plasma continuously generated by said laser; and
    (c) supplying an arc discharge voltage between said arc electrode and said intended position, said arc discharge voltage being changed periodically during said continuous laser irradiation, said plasma generated by said arc discharge being lowered or extinguished by periodically changing said arc discharge voltage, said arc discharge being induced to said intended position by said plasma generated by said laser irradiation.

2. An arc welding method according to claim 1, wherein said periodically changing voltage is an alternating voltage.

3. An arc welding method according to claim 1, wherein said periodically changing voltage is a pulsed voltage.

4. An arc welding method according to claim 3, wherein a pulse interval of said pulsed voltage is 0.1 ms or more.

5. An arc welding method according to claim 1, wherein said intended position of said object to be welded is a welding intended position within a narrow gap.

6. An arc welding method according to claim 1, wherein said laser is woven with respect to said welding intended position.

7. An arc welding apparatus for irradiating a laser to an intended position on a surface of an object to be welded, and for welding at said intended position, comprising:
    an arc electrode for generating an arc discharge to said intended position on said surface of an object to be welded;
    voltage supplying means for supplying a voltage between said arc electrode and said object to be welded;
    laser irradiating means for irradiating a laser to said intended position; and
    control means for outputting a control signal to said laser irradiating means so as to control a laser from said laser irradiating means to obtain continuous laser irradiation, inducing arc discharge between said arc electrode and said intended position by using a plasma continuously generated by said laser irradiating means, and outputting a control signal to said voltage supplying means so as to change an arc discharge voltage between said arc electrode and said object periodically during said continuous laser irradiation, and
    wherein a plasma generated by said arc discharge is lowered or extinguished by periodically changing said arc discharge voltage during said continuous laser irradiation, said arc discharge being induced to said intended position by said plasma generated by said continuous laser irradiation.

8. An arc welding apparatus according to claim 7, wherein said control means controls an arc power supply connected between said arc electrode and said object to be welded in order to supply an arc discharge pulsed voltage between said arc electrode and said object to be welded.

9. An arc welding apparatus according to claim 8, wherein a pulsed interval of said voltage is 0.1 ms or more.

10. An arc welding apparatus according to claim 8, wherein said laser irradiating means comprises an object irradiating means for irradiating a laser to said intended welding position within a narrow gap of said object to be welded.

11. An arc welding apparatus according to claim 10, wherein said laser irradiating means comprises a weaving means for weaving said laser with respect to said intended welding position within said narrow gap of said object to be welded.

12. An arc welding apparatus according to claim 7, wherein said control means comprises an arc power supply control means for controlling said arc power supply connected between said arc electrode and said object to be welded so as to supply an alternating voltage between said arc electrode and said object to be welded.

* * * * *